United States Patent
Farhady Ghalaty et al.

(10) Patent No.: US 10,867,245 B1
(45) Date of Patent: Dec. 15, 2020

(54) SYSTEM AND METHOD FOR FACILITATING PREDICTION MODEL TRAINING

(71) Applicant: Capital One Services, LLC, McLean, VA (US)

(72) Inventors: Nahid Farhady Ghalaty, McLean, VA (US); Ana Cruz, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/655,581

(22) Filed: Oct. 17, 2019

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................... G06N 3/04; G06N 3/08
See application file for complete search history.

(56) References Cited

U.S. PATENT DOCUMENTS

| 5,727,128 | A  | * | 3/1998  | Morrison ............... | G05B 17/02 |
|-----------|----|---|---------|-------------------------|------------|
|           |    |   |         |                         | 706/45     |
| 2018/0121817 | A1 | * | 5/2018  | Datta ..................... | G06N 5/045 |
| 2018/0268015 | A1 | * | 9/2018  | Sugaberry .............. | G06N 5/003 |
| 2019/0340518 | A1 | * | 11/2019 | Merrill .................. | G06K 9/6231 |
| 2019/0378046 | A1 | * | 12/2019 | Tanaka .................... | G06N 3/08  |
| 2020/0005168 | A1 | * | 1/2020  | Bhargava ............... | G06N 20/00 |
| 2020/0218825 | A1 | * | 7/2020  | Krishnamoorthy ..... | H04L 9/083 |

* cited by examiner

*Primary Examiner* — Li B. Zhen
*Assistant Examiner* — Markus A. Vasquez
(74) *Attorney, Agent, or Firm* — Pillsbury Winthrop Shaw Pittman LLP (57) ABSTRACT

In certain embodiments, training data may be generated for training a prediction model. Training data including first datasets may be obtained, where the first datasets include a plurality of feature types. A determination, via a relevancy model, based on the training data, of whether a feature type satisfies a first condition may be made. If the first condition is satisfied, one or more second datasets may be obtained to update the training data, where the second datasets include the plurality of feature types. A determination, via the relevancy model, based on the updated training data, may be made as to whether the feature type satisfies a second condition. The first and second conditions may relate to whether the feature type has a threshold amount of influence on the prediction model. If the second condition is satisfied, the updated training data may be provided to the prediction model.

20 Claims, 7 Drawing Sheets

SYSTEM AND METHOD FOR FACILITATING PREDICTION MODEL TRAINING

FIELD

Certain embodiments disclosed herein relate to facilitating prediction model training, including, for example, generating training data to train a prediction model without a feature type of the training data having an amount of influence on the prediction model.

BACKGROUND

Training data may be used to train a prediction model. The training data may include feature types that influence or impact an output of a given prediction model in different ways. An amount of influence a feature type has on the prediction model's output may vary. For instance, the training data may unknowingly causes the prediction model's results to favor or not favor a particular feature type or types. However, the prediction model needs to be trained in order to determine whether the feature types included by the training data influences or impacts the prediction model's results. Therefore, it would be beneficial to determine whether the training data will influence or impact the results of the prediction model to favor a particular feature type or types prior to the prediction model being trained.

SUMMARY

In some embodiments, training data including first datasets may be obtained. A determination of whether a feature type satisfies a condition may be effectuated via a relevancy model or other model based on the training data. As an example, the condition may relate to the feature type not having a threshold amount of influence on a machine learning model. In response to determining that the feature type fails to satisfy the condition, one or more second datasets may be obtained to update the training data such that the updated training data includes the second datasets. A determination may be of whether the feature type satisfies the condition may be effectuated via the relevancy model or other model based on the updated training data. In response to determining that the feature type satisfies the condition, the updated training data may be provided to the machine learning model to train the machine learning model.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific examples are set forth in order to provide a thorough understanding of example embodiments. It will be appreciated, however, by those having skill in the art that embodiments may be practiced without these specific details or with an equivalent arrangement.

Figure 1:
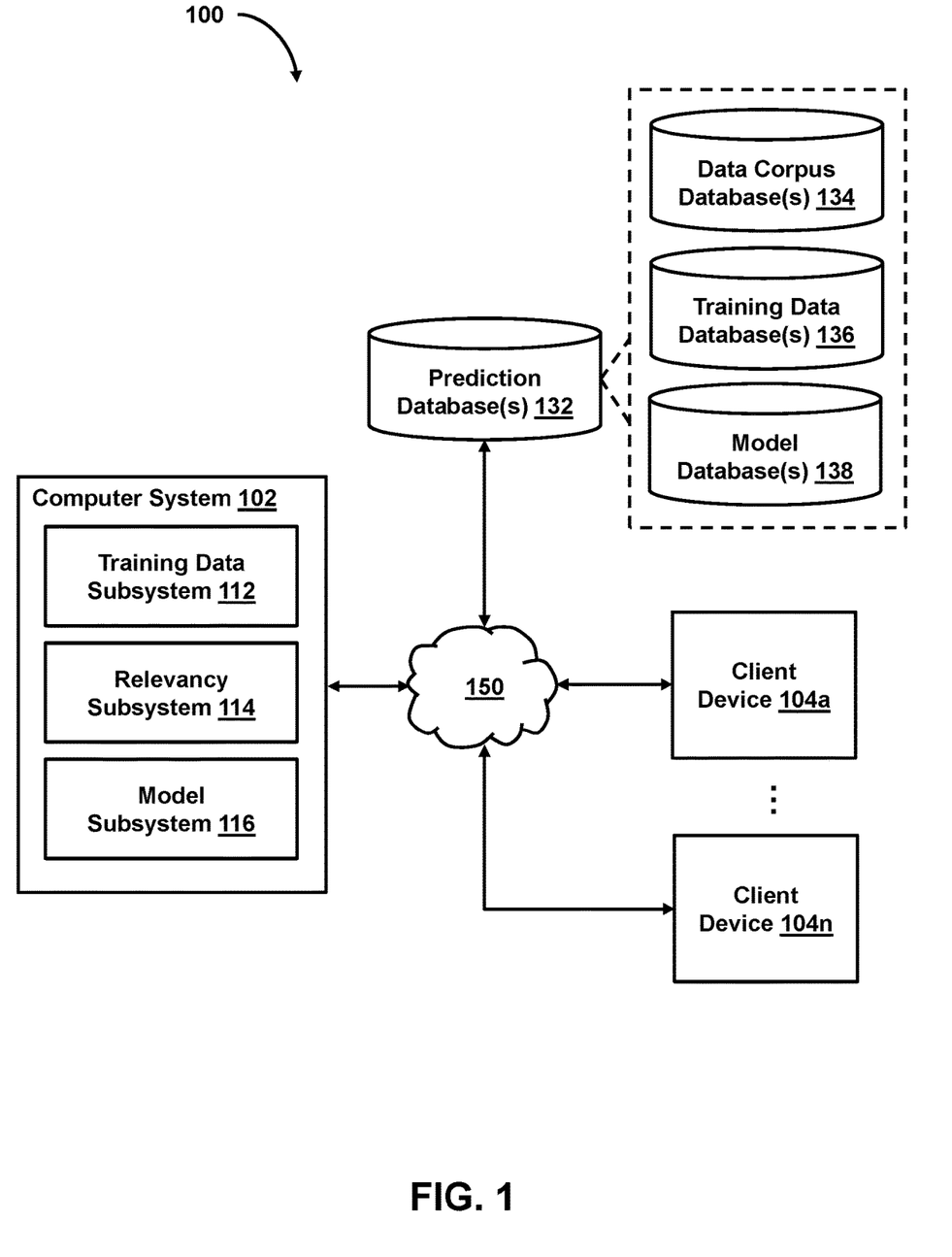
FIG. 1 show a system for facilitating prediction model training, in accordance with one or more embodiments.

FIG. 1 shows a system 100 for facilitating prediction model training, in accordance with one or more embodiments. As shown in FIG. 1, system 100 may include computer system 102, client device 104 (or client devices 104a-104n), or other components. Computer system 102 may include training data subsystem 112, relevancy subsystem 114, model subsystem 116, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may generate training data for a prediction model. Prior to using the training data to train the prediction model, the training data may be analyzed via relevancy model to determine whether the prediction model would be influenced by one or more feature types represented by the training data. Some aspects (e.g., features) of the training data may have a greater influence on the prediction model's results as compared to other aspects. Depending on the results of the relevancy model, the training data may be updated to modify (e.g., suppress or boost) the amount of the influence these feature types have on the prediction model's results. In this way, the prediction model's results may be improved because the prediction model will be trained with optimized training data. For example, the training data used to train the prediction model may reduce or eliminate an impact of one or more particular feature types on the results of the prediction model. In this way, because of the reduction or elimination of such impact, the foregoing may improve the accuracy of the prediction model.

In some embodiments, system 100 may obtain one or more datasets for generating training data to be used to train the prediction model. In some embodiments, the datasets may be randomly selected from one or more data corpora. The datasets may include a plurality of feature types, and each dataset may include some or all of the plurality of feature types. In some embodiments, data including a set of different features may be provided as an input into a prediction model to obtain a result. The features may be of a same "type" or may be of different types. As an example, data including features, such as noise ratios, lengths of sound, relative power, etc., may serve as an input to a prediction model related to recognizing phonemes for speech recognition processes. As another example, data including features such as edges, objects, pixel information, may serve as an input to a prediction model related to computer vision analysis. As still yet another example, data including features, such as income, credit score, and biographical information may serve as an input to a prediction model related to financial applications. Each of the features (e.g., noise rations, lengths of sound, relative power, edges, objects, income, credit score, biographical information, or other features) may be different types of features. The feature type may relate to the genre of the prediction model (e.g., speech recognition models, computer vision models, etc.) or the different individual fields encompassed by a feature (e.g., length of sounds in units of time, income in units of dollars, etc.). As described herein, a feature type corresponds to a type of feature, i.e., what the feature represents. For example, the feature type of salary information corresponds to the feature salary, which may be used as an input to a financially-related prediction model.

A dataset may include data associated with one or more different feature types. For example, a dataset may include financially relevant data, such as credit card applications, loan applications, or other applications. In one use case, the dataset may include a number of credit card application forms, where each such form is associated with a particular individual or entity. The information included within the credit card application form (e.g., name, address, age, gender, salary, etc.) may correspond to data for the individual or entity. The collection of the credit card application forms may encompass some or all of a dataset, and the information may encompass some or all of the data including various feature types.

In some embodiments, the feature types represented by a dataset may be homogenous to a particular field such that the dataset may be used to train a particular type of prediction model. As an example, a dataset may include data associated with feature types such as automobile prices, automobile fuel economies, and automobile styles. This dataset may be used to train a prediction model for pricing and/or selecting an automobile. As another example, a dataset may include data associated with feature types such as credit scores, salary information, and biographical information. This dataset may be used to train a prediction model for approving/disapproving loans. In some embodiments, the feature types included within a dataset may be related to different fields. As an example, a dataset may include data associated with feature types such as automobile prices and credit scores.

Different feature types may influence an output of a given prediction model in different ways. An amount of influence a feature type has on the prediction model's output may vary. Depending on the amount of influence, a determination may be made prior to using the training data to train the prediction model as to whether the training data unknowingly causes the prediction model's results to favor or not favor a particular feature type or types. For instance, a determination should be made prior to training the prediction model as to whether the training data includes feature types having a threshold amount of influence on the prediction model's results as compared to other feature types. If so, a determination may also be made as to whether those feature types should influence the prediction model to their particular extent.

In some embodiments, prior to providing training data to the prediction model for training the prediction model, the training data may first be provided to a relevancy model. The relevancy model may determine how relevant one or more feature types are to the output of the prediction model. Alternatively, the training data may be provided to an irrelevancy model to determine how irrelevant one or more feature types are to the output of the prediction model. In some embodiments, a feature type determined to have a threshold amount of influence (or more) on the prediction model's results may indicate that the training data should be updated. In some embodiments, updating the training data may improve the accuracy and reliability of the prediction model because the amount of influence imparted by the feature type may be reduced. For example, the training data may be used to eliminate or reduce an impact of a feature type on the results of the prediction model. Therefore, if the relevancy model indicates that the datasets used to generate the training data include a feature type that has an amount of influence equal to or greater than the threshold amount of influence, then the training data may be updated. In this way, because of the reduction or elimination of such impact, the foregoing may improve the prediction model.

In some embodiments, the training data may be generated by aggregating the datasets together. After aggregation, the datasets may be formatted, normalized, or processed in other manners so that the training data may be provided to the relevancy model as an input. Continuing the aforementioned example related to credit card applications, the datasets may be formatted such that extraneous characters are removed, a same input language is used, or the like. In some embodiments, the datasets may be formatted by including logical zeros or null values for information not provided. For example, a credit card application having the address field left blank may be automatically filled in with a logical zero (e.g., "0") to allow the application to be aggregated with other applications when compiling the training data.

In some embodiments, updating the training data may include obtaining one or more additional datasets. Some embodiments may include randomly selecting the additional datasets from one or more data corpora. Each additional dataset may be selected from a same data corpus as the data corpora with which the initial datasets were selected from. The randomly selected additional datasets and at least some of the previously obtained datasets may be used to generate the updated training data. The updated training data may be provided to the relevancy model to determine whether the relevance of the feature type has the threshold amount of influence on the prediction model's results. If not, the updated training data may be provided to the prediction model such that the prediction model may be trained on the updated training data. However, if the relevance of the feature type has the threshold amount of influence on the prediction model's results, the process of obtaining more datasets may be repeated to generate further updated training data.

In some embodiments, a set of feature types may be identified prior to providing the training data to the relevancy model. The set of feature types may include one or more feature types that should be prevented from having the threshold amount of influence on the prediction model, e.g., the prediction model's results. Preventing a feature type from having the threshold amount of influence on the prediction model may include ensuring that the amount of influence of each feature type of the set of feature types is less than the threshold amount of influence. In some embodiments, after the feature type has been prevented from having the threshold amount of influence on the prediction model's results (e.g., determined to not have or have less than the threshold amount of influence), based on the updated training data, another determination may be made. This additional determination may include analyzing whether one or more other feature types from the set of feature types has/have the threshold amount of influence on the prediction model. If so, then the process of obtaining datasets and generating updated training data may also be repeated until all feature types included within the set of feature types have less than the threshold amount of influence on the prediction model.

In some embodiments, the relevancy model may include one or more statistical relevancy models. As an example, the relevancy model may include principal component analysis (PCA) model for identifying a principal component of a dataset. The principle component may be the feature type that has the largest amount of variance for the training data. For example, the principle component may be the feature type having a greatest relevance on the prediction model's results with respect to other feature types. PCA may be thought of as fitting an n-dimensional ellipsoid to the training data. The axes of the n-dimensional ellipsoid represent the principle components of the training data.

To determine whether the relevance of a feature type included within the training data will have an amount of influence on a prediction model equal to or greater than a threshold amount of influence, a relevance of one or more feature types may be determined via a relevancy model. For example, the principle component or components of the training data may be determined via the PCA model. In some embodiments, the relevance of a feature type may be determined. If the relevance of a particular feature type satisfies a condition, this may indicate that the training data should be updated. In some embodiments, the condition may be whether a feature type's amount of influence is equal to or greater than a threshold amount of influence. For example, the relevancy model may compute a relevancy score for the feature type, and the relevancy threshold score may be set a particular value (e.g., >0.01). In this example, if the relevancy score exceeds the relevancy threshold score, the feature type satisfies the condition. In some embodiments, the condition may be whether the feature type's amount of influence is less than a threshold amount of influence. For example, if the relevancy score is less than the relevancy threshold score, then feature type may satisfy the condition.

Although a PCA model is described above, different relevancy models may alternatively or additionally be used to reduce the amount of influence of a particular feature type. For example, models including correspondence analysis (CA), factor analysis, K-means clustering, and non-negative matrix factorization may be used to identify relevant dimensions of a dataset, and furthermore for reducing the amount of influence of those dimensions. Still further, models including independent component analysis (ICA) and network component analysis may be used in lieu of or in addition to a PCA model for determining relevancy.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
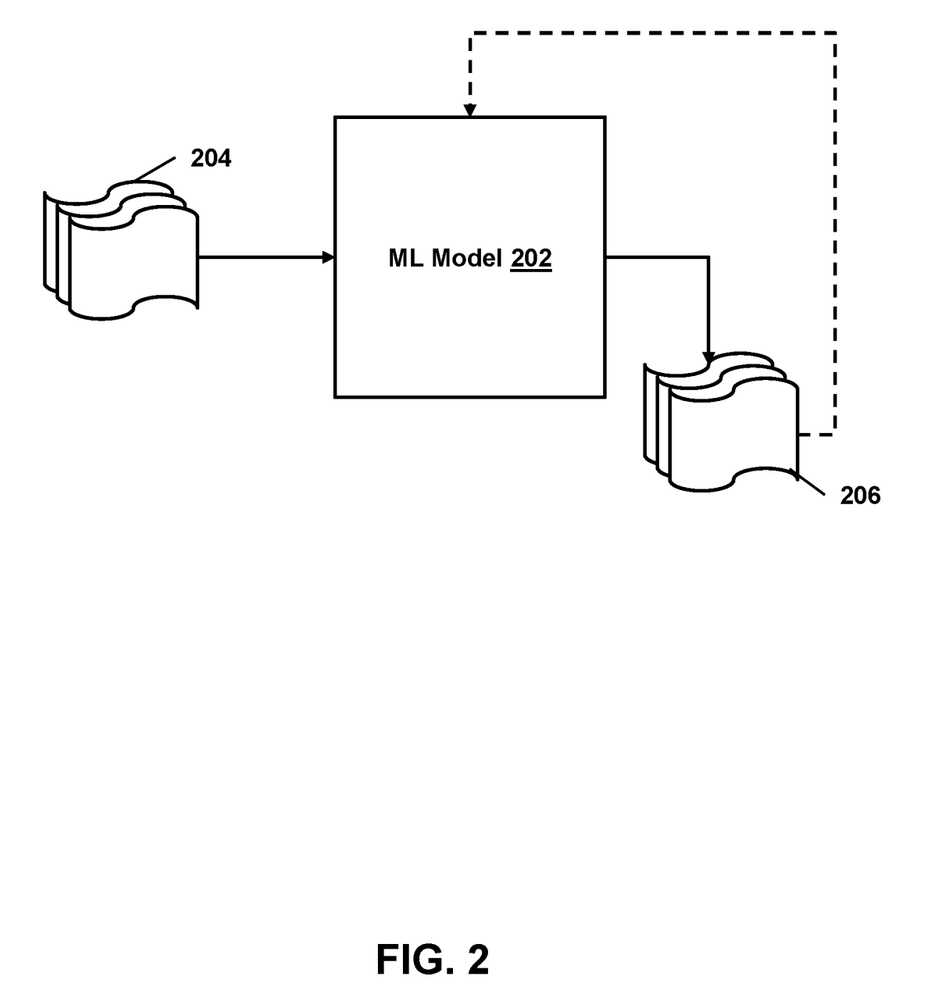
FIG. 2 shows a prediction model trained using training data, in accordance with one or more embodiments.

As an example, with respect to FIG. 2, machine learning model 202 may take inputs 202 and provide outputs 206. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In some embodiments, machine learning model 202 may update its configurations (e.g., weights, biases, or other parameters) based on its assessment of its prediction (e.g., outputs 206) and reference feedback information (e.g., user indication of accuracy, reference labels, or other information). In some embodiments, where machine learning model 202 is a neural network, connection weights may be adjusted to reconcile differences between the neural network's prediction and the reference feedback. Some embodiments include one or more neurons (or nodes) of the neural network requiring that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-116

In some embodiments, training data subsystem 112 may generate training data based, at least in part, on one or more datasets obtained from data corpus database(s) 134. Data corpus database(s) 134 may include one or more data corpora configured to store a plurality of datasets. The datasets may be used to create training data for training a prediction model. As an example, with respect to FIG. 3, data corpus databases 134 may include datasets 1-M. In some embodiments, the number of datasets stored within data corpus databases 134 may be 100 or more datasets, 1,000 or more datasets, 1,000,000 or more datasets, etc.

Figure 3:
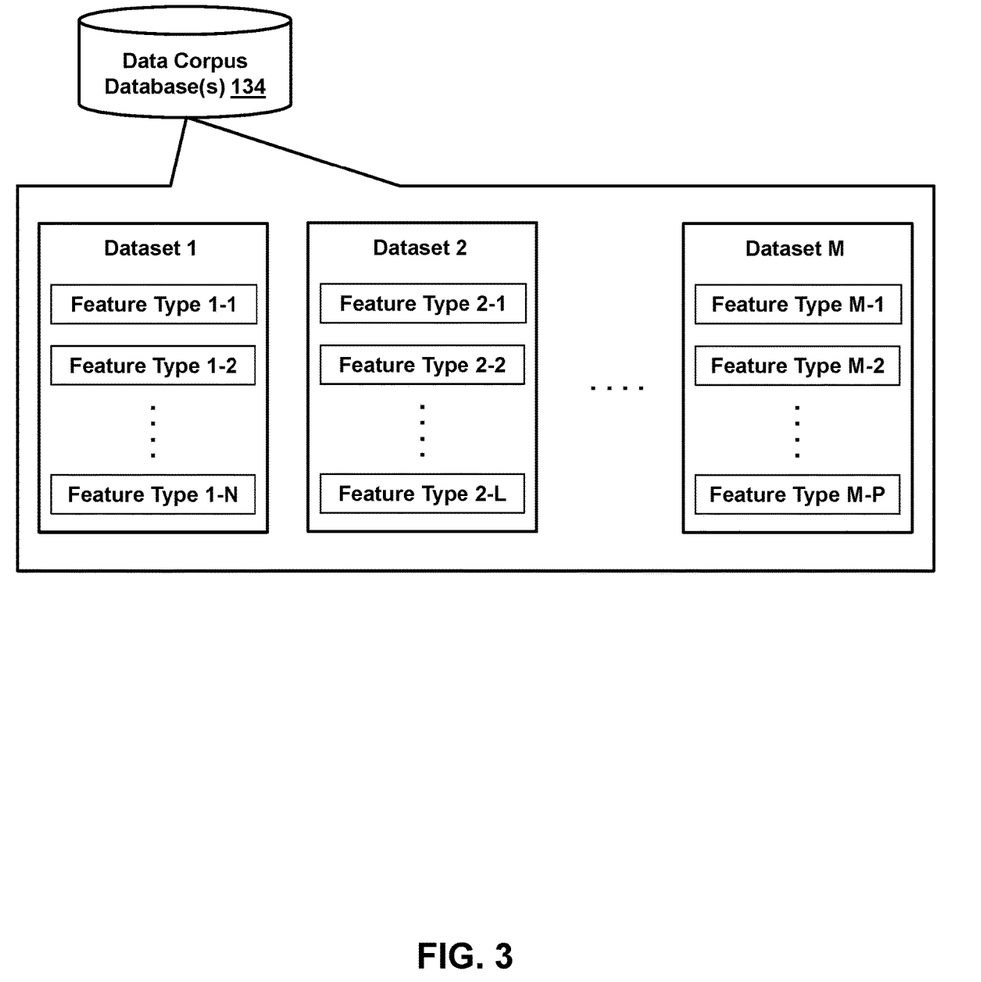
FIG. 3 shows a data corpus database, in accordance with one or more embodiments.

Each dataset may be associated with one or more feature types. For example, dataset 1 may include data associated with N different feature types, dataset 2 may include data associated with L different feature types, and dataset M may include data associated with P different feature types. In some embodiments, N, L, and P are integer numbers greater than one. In some embodiments, N, L, and P may be the same or different. Furthermore, the feature types included in each of the M-datasets may overlap. For instance, one feature type represented within dataset 1 may also be represented within dataset 2. In some embodiments, the number of feature types (e.g., N, L, P) in the M-datasets may be 2 or more feature types, 10 or more feature types, 100 or more feature types, 1,000 or more feature types, etc.

Training data subsystem 112 may obtain one or more datasets from data corpus databases 134. In some embodiments, training data subsystem 112 may be configured to randomly select the datasets from data corpus databases 134 in response to an instruction received from client device 104. For example, client device 104 may receive a request to train, or generate training data for training, a prediction model. In response to the request, client device 104 may generate and send an instruction across network(s) 150 to computer system 102. Upon receipt of the instruction, training data subsystem 112 may access data corpus databases 134 and randomly select the datasets.

Some embodiments may include randomly selecting the datasets by determining a random seed value via a random number generator. A dataset may be selected based on the random seed value. For example, training data subsystem 112 and/or data corpus databases 134 may include an index of the stored datasets, e.g., datasets 1-M. The random seed value may be input into a hash function, obtaining a hash value used to identify a dataset to be selected. For instance, each dataset may be associated with a hash value or a range of hash values, and a dataset may be selected based on the obtained hash value for a given random seed value. After a dataset is selected, the dataset may be provided to training data subsystem 112 via network(s) 150. In some embodiments, the number of datasets selected may include 10 or more datasets, 100 or more datasets, or 1,000 or more datasets. In some embodiments, the datasets may be retrieved from data corpus databases 134 serially and/or in parallel.

In some embodiments, training data subsystem 112 may be configured to generate training data based on the randomly selected datasets obtained from data corpus databases 134. The training data may include some or all of the obtained datasets. For example, each dataset obtained from data corpus databases 134 may be used to generate the training data. Alternatively, only some of the datasets obtained from data corpus databases 134 may be used to generate the training data. In some embodiments, the datasets used to generate the training data may be randomly selected from the obtained datasets.

In some embodiments, the datasets used to generate the training data may include a plurality of feature types. For example, the datasets may include 2 or more feature types, 10 or more feature types, 100 or more feature types, 1,000 or more feature types, or 100,000 or more feature types. In some embodiments, different datasets may have a different number of feature types, and some datasets may include similar feature types.

In some embodiments, the obtained datasets may include feature types that, when included within the training data used to train a prediction model, influence the prediction model to favor a particular result. The amount of influence that a feature type has on the prediction model's results may vary, and some feature types may have more influence than others. In some embodiments, a determination may be made as to an amount of influence that a particular feature type has on a given prediction model. To perform this determination, the training data may be provided to a relevancy model prior to being used to train the prediction model. If the amount of influence, as determined using the relevancy model, of a feature type is equal to or greater than a threshold amount of influence, then the training data may be updated. The updated training data may also be provided to the relevancy model to ensure that the feature type has less than the threshold amount of influence on the prediction model. In some embodiments, the threshold amount of influence may be predetermined. For example, a numeric value may be set as the threshold amount of influence, e.g., 0.1. In this way, if a certain feature type has more or less influence than desired, the training data may not be used to train the prediction model, and updated training data may be generated.

Depending on the prediction model, an amount of influence may be computed for a particular set of feature types. In some embodiments, the request received from client device 104 may indicate which prediction model is to be trained. Prediction models to be trained or that have been trained may be stored in model database(s) 138. Each prediction model may be stored in association with an identifier that may allow computer system 102 and/or client device(s) 104 to access that prediction model. In some embodiments, the request may include the identifier indicating the particular prediction model(s) to be retrieved. In some embodiments, model subsystem 116 may determine the prediction model to be accessed from model databases 138 based on the request. The feature types that may be input to a prediction model may also be stored in model databases 138. For instance, each prediction model may indicate the feature types that serve as inputs.

In some embodiments, each prediction model may indicate a set of feature types that should not serve as an input and/or should have less than the threshold amount of influence on the prediction model. For instance, the set of feature may be those feature types that should be prevented from having the threshold amount of influence on the prediction model. If a feature type from the set of feature types is determined to have an amount of influence on the prediction model that is equal to or greater than a threshold amount of influence, this may indicate that the training data should not be used to train the prediction model. In some embodiments, if the feature type is determined to have an amount of influence on the prediction model that is equal to or greater than the threshold amount of influence, the training data may be updated. The amount of influence the feature type has on the prediction model may be determined again, this time based on the updated training data. In some embodiments, the feature type(s) that should have less than the threshold amount of influence may be pre-selected prior to being provided to the relevancy model. For instance, the relevancy model may be used to determine a relevance of a first feature type based on the prediction model to be served with the input training data. In some embodiments, the feature type may be randomly selected. Furthermore, in some embodiments, multiple feature types may be checked via the relevancy model in parallel.

In some embodiments, the training data may be provided to relevancy subsystem 114.

Furthermore, an indication of a particular feature type or feature types with which a relevance is to be determined may be provided to relevancy subsystem 114. Some embodiments may determine a relevance for each feature type the training data includes. Relevancy subsystem 114 may obtain a relevancy model from model database(s) 138. Relevancy subsystem 114 may input the training data to the relevancy model and may determine a relevance of one (or more) of the feature types. As an example, the relevancy model may be the PCA model, and the training data may be analyzed to determine the principle component.

In some embodiments, relevancy subsystem 114 may determine whether the relevance satisfies a condition, such as if an amount of influence a feature type would have on a prediction model's results if trained on the training data is equal to or greater than a threshold amount of influence. As an example, relevancy subsystem 114 may compute, via the relevancy model, a relevancy score associated with a feature type based on the training data. Relevancy subsystem 114 may compare the relevancy score to a relevancy threshold score. If the relevancy score is equal to or greater than the relevancy threshold score, this may indicate that the prediction model should not be trained using the training data. For instance, if the training data was used to train the prediction model, the feature type may have an undesired amount of influence on the prediction model's results (e.g., favoring a particular outcome). In response to determining that the relevancy of the feature type satisfies the condition, relevancy subsystem 114 may generate an instruction or other indication to cause training data subsystem 112 to obtain one or more additional datasets for updating the training data.

After receiving the indication that the additional datasets are to be obtained, training data subsystem 112 may access data corpus database(s) 134. Similarly to the previously described process for obtaining the datasets used to generate the training data, the additional datasets may also be randomly selected from data corpus database(s) 134. Training data subsystem 112 may be configured to generate updated training data based on the additional datasets and the previously obtained datasets. In some embodiments, the updated training data may include at least some of the additional datasets and at least some of the previously obtained datasets.

In some embodiments, the additional datasets may include some or all of the plurality of feature types that the previously obtained datasets included. For example, if the previously obtained datasets included data associated with feature type A and feature type B, the additional datasets may also include data associated with feature type A and feature type B. In some embodiments, the additional datasets may include data associated with additional feature types. For example, the additional datasets may also include data associated with feature type C. Therefore, the updated training data may include data associated with feature types A and B, as well as feature type C.

After the updated training data is generated, relevancy subsystem 114 may input the updated training data to the relevancy model. In some embodiments, relevancy subsystem 114 may be configured to determine whether an updated relevance of the feature type satisfies an additional condition. The additional condition may relate to whether the feature type has the threshold amount of influence (or more) on the prediction model if the prediction model were trained using the updated training data. In some embodiments, the feature type analyzed against the additional condition is the same feature type previously analyzed. For example, the feature type having a relevance previously determined to satisfy the condition, e.g., that the feature type has an amount of influence on the prediction model's results equal to or greater than the threshold amount of influence, may be checked to determine whether an updated relevance of the feature type satisfies the additional condition, e.g., that the feature type has an updated amount of influence on the prediction model's results less than the threshold amount of influence.

In some embodiments, the training data generated based on the previously obtained datasets including a plurality of feature types may be input to the relevancy model, and a determination may be made whether a feature type of the plurality of feature types satisfies a first condition. The first condition may indicate whether the feature type will have the threshold amount of influence on the prediction model if trained on the training data. If the feature type is determined to satisfy the first condition, the updated training data may be generated based on the additional datasets including the plurality of feature types. After being generated, the updated training data may be provided as an input to the relevancy model, and a determination may be made whether the feature type satisfies a second condition. The second condition may indicate whether the feature type will not have the threshold amount of influence (e.g., has less than the threshold amount of influence) on the prediction model if trained on the updated training data. If the feature type satisfies the second condition, the updated training data may be provided to the prediction model so that the prediction model may be trained on the updated training data. If the feature type does not satisfy the second condition, then the training data may again be updated by repeating the foregoing process.

As an example, relevancy subsystem 114 may compute, via the relevancy model, a relevancy score associated with a feature type based on the training data. Relevancy subsystem 114 may then compare the relevancy score to a relevancy threshold score. If the relevancy score is equal to or greater than the relevancy threshold score, this may indicate that the prediction model should not be trained using the training data. For instance, if the training data was used to train the prediction model, the feature type could have an undesired amount of influence on the prediction model's results. In response to determining that the relevancy of the feature type satisfies the condition, relevancy subsystem 114 may generate an instruction or other indication to cause training data subsystem 112 to obtain one or more additional datasets for updating the training data.

In some embodiments, model subsystem 116 may be configured to receive training data from relevancy subsystem 114. The training data may be received by model subsystem 116 subsequent to relevancy subsystem 114 determining that no feature type of a predetermined set of feature types has the threshold amount of influence (or more) on the prediction model's results if the prediction model were to be trained using the received training data. For example, as previously mentioned, each prediction model may include a set of feature types that should not have more a threshold amount of influence on the prediction model's results. Relevancy subsystem 114 may determine whether particular training data satisfies such criteria, and upon doing so, may provide the training data to model subsystem 116.

In some embodiments, model subsystem 116 may provide the training data, e.g., the training data that does not include any feature type from the set of feature types having the threshold amount of influence, to training data database(s) 136. The training data may be stored by training data database(s) 136 to be used to train the prediction model. In some embodiments, model subsystem 116 may alternatively or additionally provide the training data to the prediction model for training the prediction model. For example, model subsystem 116 may obtain the prediction model from model database(s) 138. The received training data may input to the prediction model to train the prediction model, or the training data may be retrieved from training data database(s) 136 and then input to the prediction model in order to train the prediction model. In some embodiments, the training data stored in training data database(s) 136 may include a timestamp indicating a creation time for that training data. Furthermore, the datasets included in the training data and the feature types analyzed by the relevancy model for the training data may also be stored in association with the training data for subsequent/additional prediction model training.

Figure 4A:
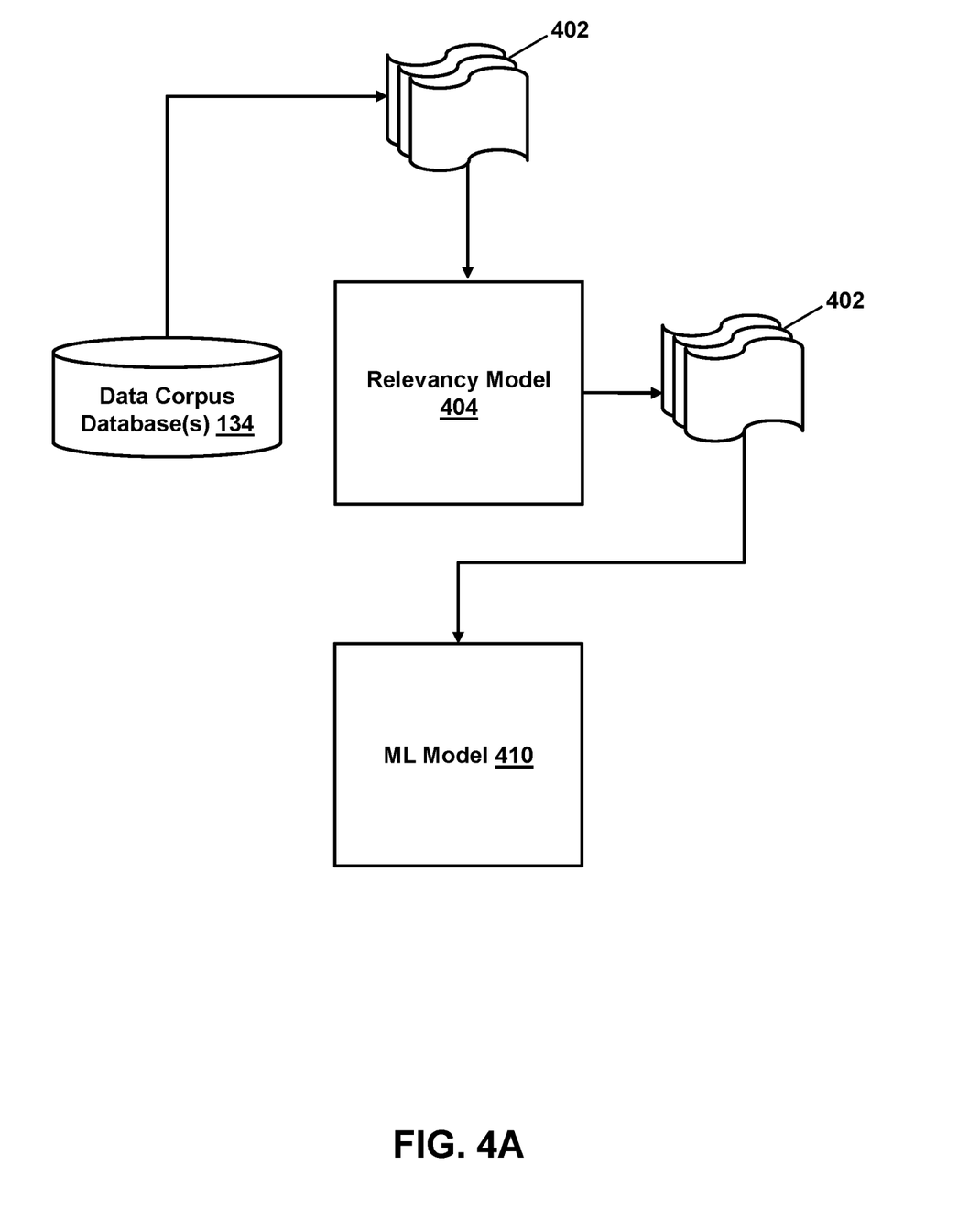
FIG. 4A shows a relevancy model configured to determine a relevance of a feature type based on input training data, in accordance with one or more embodiments.

FIG. 4A shows a relevancy model configured to determine a relevance of a feature type based on input training data, in accordance with one or more embodiments. In some embodiments, training data 402 may be generated based on one or more datasets randomly obtained from data corpus database(s) 134. The randomly obtained datasets may include a plurality of features. Training data 402 may be provided to relevancy model 404 to determine a relevance of at least one of the plurality of features. In some embodiments, the feature(s) whose relevance is to be determined may be included in a set of feature types that should have less than a threshold amount of influence on results obtained by a machine learning model 410 if machine learning model 410 were trained using training data 402. In some embodiments, relevancy model 404 computes a relevancy score for the feature type, e.g., one of the feature types from the set of feature types. If the relevancy score for the feature type is less than a relevancy threshold score, then the training data 402 may be provided to machine learning model 410 for training. The relevancy score for the feature type being less than the relevancy threshold score may indicate that the feature type has less than a threshold amount of influence of the results of machine learning model 410. Therefore, so long as no other feature types included in the set of feature types represented by training data 402 have equal to or greater than the threshold amount of influence, training data 402 may be used to train machine learning model 410.

In some embodiments, the relevancy threshold score may be a numerical value. For example, the relevancy threshold score may be 0.1, 0.01, 0.001, etc. If the relevancy score for a feature type is determined to be 0.09 via relevancy model 404, and the relevancy threshold score is set as 0.1, then the feature type has less than the threshold amount of influence on machine learning model 410. In this scenario, the training data (e.g., training data 402) may be provided to machine learning model 410 for training machine learning model 410.

Figure 4B:
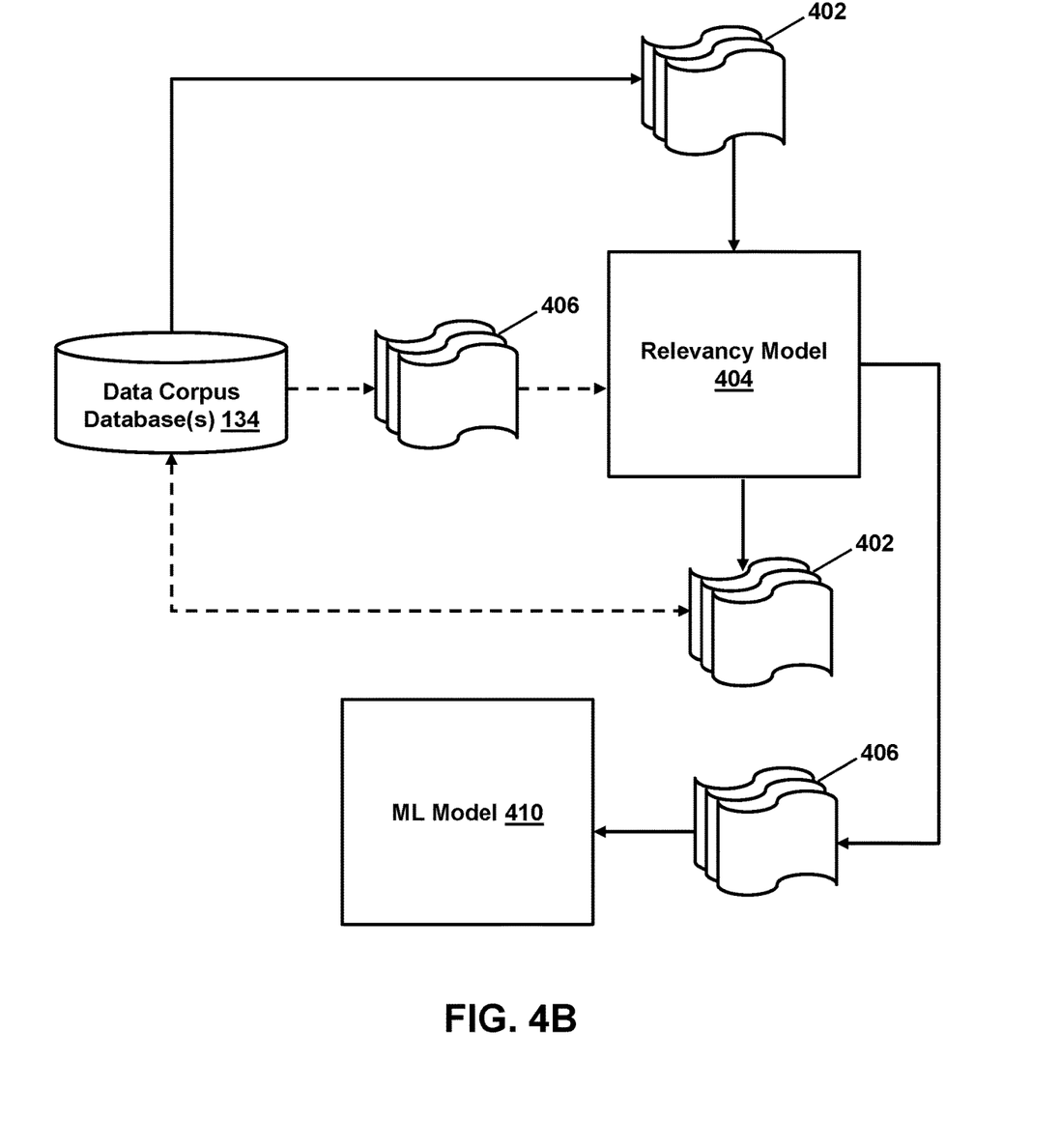
FIG. 4B shows the relevancy model configured to determine an updated relevance of the feature type based on input updated training data, in accordance with one or more embodiments.

On the other hand, as seen with reference to FIG. 4B, if the relevancy score for a feature type is determined to be 0.12 via relevancy model 404, and the relevancy threshold score is set as 0.1, then the feature type may have more than a threshold amount of influence on machine learning model 410. In this scenario, one or more additional datasets may be randomly selected from data corpus database(s) 134. The additional datasets and the previously obtained datasets (used to generate training data 402) may be used to generate updated training data 406. In some embodiments, updated training data 406 may be provided as an input to relevancy model 404, which may compute an updated relevancy score for the feature type. If the relevancy score still is equal to or greater than the relevancy threshold score, then the process of obtaining datasets and updating the training data may be repeated. However, if the relevancy score is now less than the relevancy threshold score, updated training data 406 may be provided to machine learning model 410.

Example Flowcharts

Figure 5:
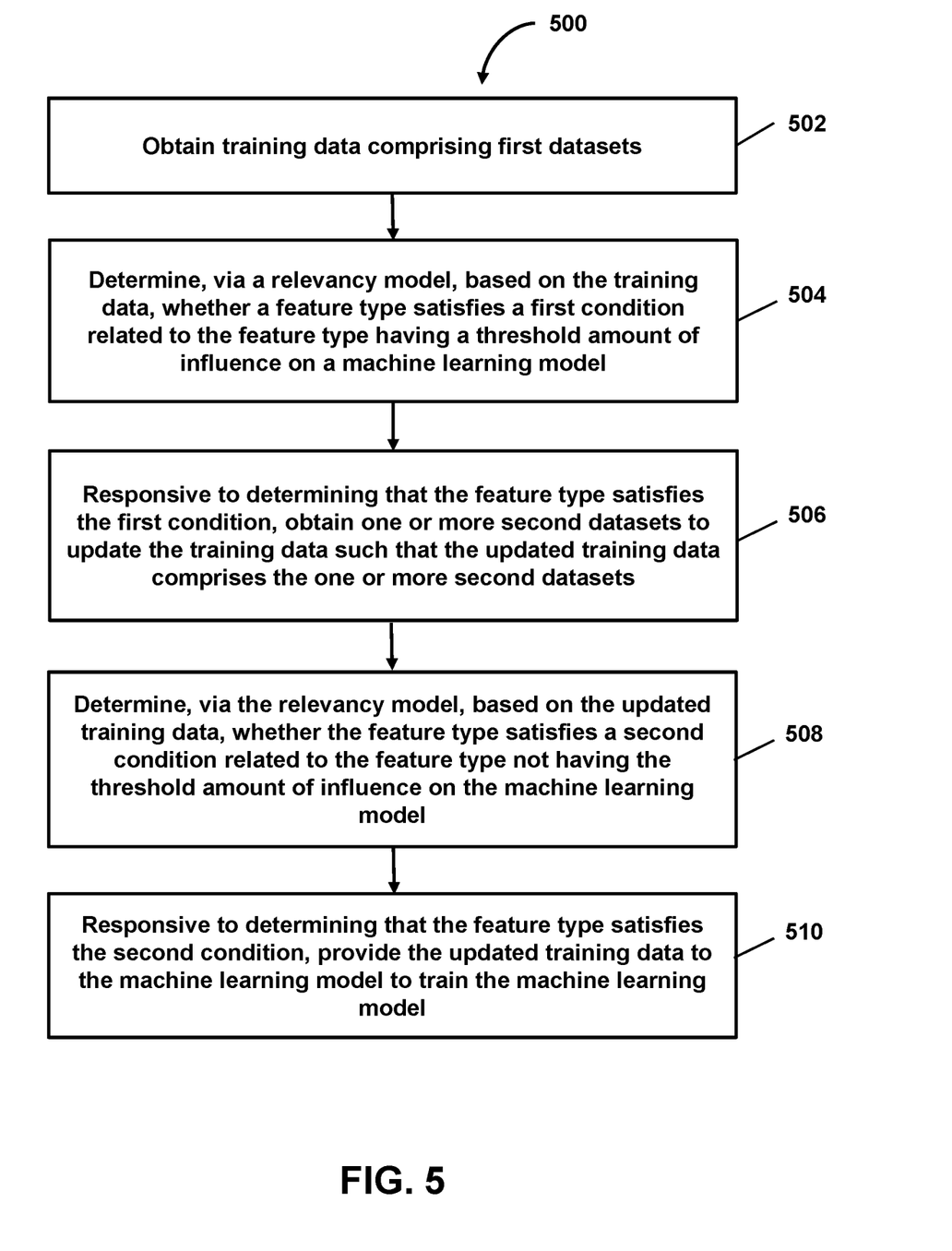
FIG. 5 shows a flowchart of a method of facilitating prediction model training, in accordance with one or more embodiments.
Figure 6:
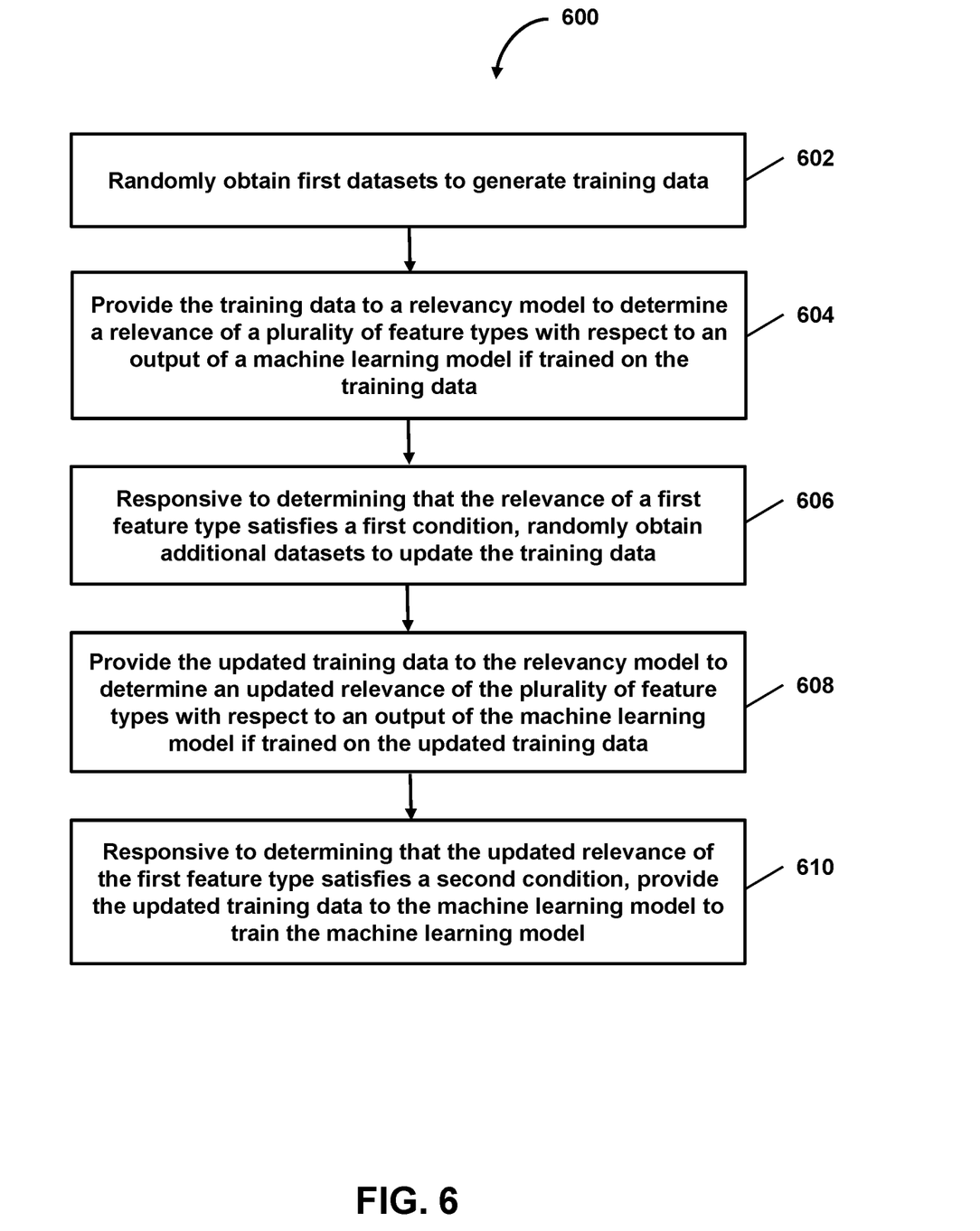
FIG. 6 shows a flowchart of another method for facilitating prediction model training, in accordance with one or more embodiments.

FIGS. 5 and 6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a method 500 of facilitating prediction model training, in accordance with one or more embodiments. In an operation 502, training data including first datasets may be obtained. The first datasets may include a plurality of feature types. As an example, one or more first datasets may be randomly obtained from one or more data corpora. The randomly obtained first datasets may include a plurality of features, and may be used to generate training data for training a prediction model. In some embodiments, operation 502 may be performed by a subsystem that is the same or similar to training data subsystem 112.

In an operation 504, a determination may be made, via a relevancy model and based on the generated training data, as to whether a feature type satisfies a first condition. The first condition may relate to the feature type having a threshold amount of influence on a machine learning model. The feature type may be one of a plurality of feature types that the datasets include. As an example, the training data may be provided to a relevancy model, and the relevancy model may determine a relevancy score for a feature type included by the training data. If the relevancy score is equal to or greater than a relevancy threshold score, the feature type may be considered to have a threshold amount of influence on a prediction model to be trained on the training data. If the relevancy score is less than the relevancy threshold score, the feature type may be considered to not have (e.g., considered to have less than) the threshold amount of influence on the prediction model to be trained on the training data. In some embodiments, operation 504 may be performed by a subsystem that is the same or similar to relevancy subsystem 114.

In an operation 506, responsive to determining that the feature type satisfies the first condition, one or more second datasets may be obtained to update the training data. The updated training data may include the second datasets, where the second datasets include the plurality of feature types. As an example, if the relevancy score for the feature type is equal to or greater than the relevancy threshold score, one or more additional datasets may randomly be obtained from the data corpora. The additional datasets and the previously obtained datasets may be used to generate updated training data, which may include the plurality of feature types. In some embodiments, the updated training data may include one or more additional feature types. In some embodiments, operation 506 may be performed by a subsystem that is the same or similar to training data sub system 112.

In an operation 508, a determination may be made, via the relevancy model, and based on the updated training data, as to whether the feature type satisfies a second condition. The second condition may relate to the feature type not having the threshold amount of influence on the machine learning model. As an example, the updated training data may be provided as an input to the relevancy model. The relevancy model may determine an updated relevancy score for the feature type included by the training data. If the updated relevancy score is equal to or greater than the relevancy threshold score, the feature type may be considered to have the threshold amount of influence on the prediction model to be trained on the updated training data. If the updated relevancy score is less than the relevancy threshold score, the feature type may be considered to not have (e.g., considered to have less than) the threshold amount of influence on the prediction model to be trained on the updated training data. In some embodiments, operation 508 may be performed by a subsystem that is the same or similar to relevancy subsystem 114.

In an operation 510, responsive to determining that the feature type satisfies the second condition, the updated training data may be provided to the machine learning model to train the machine learning model. As an example, after determining that the updated relevancy score for the feature type is less than the relevancy threshold score, the updated training data may be provided to the prediction model. The updated training data may be used to train the prediction model. In some embodiments, operation 510 may be performed by a subsystem that is the same or similar to model subsystem 116.

FIG. 6 shows a flowchart of a method 600 for facilitating prediction model training, in accordance with one or more embodiments. In an operation 602, first datasets may be randomly obtained to generate training data such that the training data includes the randomly obtained first datasets. The first datasets may include a plurality of feature types. As an example, first datasets may be randomly obtained from a data corpus. Training data for training a prediction model may be generated such that the training data includes the randomly obtained first datasets. The randomly obtained first datasets may include a plurality of feature types. In some embodiments, operation 602 may be performed by a subsystem that is the same or similar to training data sub system 112.

In an operation 604, the training data may be provided to a relevancy model to determine a relevance of each feature type of the plurality of feature types with respect to an output of a prediction model if the prediction model is trained on the training data. As an example, the training data may be provided as an input to a relevancy model, and the relevancy model may determine a relevancy score for each feature type of the plurality of feature types. The relevancy score may indicate how relevant each feature type is to an output of a machine learning model if that machine learning model were provided with and trained on the training data. In some embodiments, operation 604 may be performed by a subsystem that is the same or similar to relevancy sub system 114.

In an operation 606, responsive to determining that the relevance of a first feature type of the plurality of feature types satisfies a first condition, additional datasets may be randomly obtained to update the training data. The updated training data may include the additional datasets and at least some of the first datasets. The first condition may indicate that the first feature type will have a threshold amount of influence on the prediction model if the prediction model is trained on the training data. The additional datasets may include the plurality of feature types. As an example, if the relevancy score of a first feature type, as determine via the relevancy model, is equal to or greater than a relevancy threshold score, the first feature type may be considered to have a threshold amount of influence on a machine learning model to be trained on the training data. In this scenario, additional datasets including the plurality of feature types may be randomly obtained from the data corpus such that updated training data may be generated. If the relevancy score is less than the relevancy threshold score, the first feature type may be considered to not have, or have less than, the threshold amount of influence on the machine learning model to be trained on the training data. In some embodiments, operation 606 may be performed by a subsystem that is the same or similar to relevancy subsystem 114. In some embodiments, operation 606 may be performed by a subsystem that is the same or similar to training data subsystem 112. In some embodiments, operation 606 may be performed by subsystems the same or similar to training data subsystem 112 and relevancy subsystem 114.

In an operation 608, the updated training data may be provided to the relevancy model to determine an updated relevance of each feature type of the plurality of feature types with respect to an output of the prediction model if the prediction model is trained on the updated training data. As an example, the updated training data may be provided to the relevancy model. The relevancy model may determine an updated relevancy score for each feature type of the plurality of feature types included by the updated training data with respect to the machine learning model. In some embodiments, operation 608 may be performed by a subsystem that is the same or similar to relevancy sub system 114.

In an operation 610, responsive to determining that the updated relevance of the first feature type satisfies a second condition, the updated training data may be provided to the prediction model to train the prediction model. The second condition may indicate that the first feature type will not have the threshold amount of influence on the machine learning model if the machine learning model is trained on the updated training data. As an example, if the updated relevancy score is equal to or greater than the relevancy threshold score, the feature type may be considered to have the threshold amount of influence on the prediction model to be trained on the updated training data. If the updated relevancy score is less than the relevancy threshold score, the feature type may be considered to not have, or have less than, the threshold amount of influence on the prediction model to be trained on the updated training data. If the updated relevancy score is less than the relevancy score threshold, the updated training data may be provided to the machine learning model for training the machine learning model. In some embodiments, operation 610 may be performed by a subsystem that is the same or similar to model subsystem 116. In some embodiments, operation 610 may be performed by a subsystem that is the same or similar to relevancy subsystem 114. In some embodiments, operation 610 may be performed by subsystems the same or similar to relevancy subsystem 114 and model subsystem 116.

In some embodiments, the various computers and subsystems illustrated in FIG. 1 may include one or more computing devices that are programmed to perform the functions described herein. The computing devices may include one or more electronic storages (e.g., prediction database(s) 132, which may include data corpus database(s) 134, training data database(s) 136, model database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although example embodiments have been described in detail for the purpose of illustration, it is to be understood that such detail is solely for that purpose and that embodiments are not limited to the disclosed embodiments, but, on the contrary, are intended to cover modifications and equivalent arrangements that are within the scope of the appended claims. For example, it is to be understood that embodiments contemplate that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "comprise," "comprising," "comprises," "include", "including", and "includes" and the like mean including, but not limited to. As used throughout this application, the singular forms "a," "an," and "the" include plural referents unless the context clearly indicates otherwise, and notwithstanding the use of other terms and phrases for one or more elements, such as "one or more." The term "or" is non-exclusive (i.e., encompassing both "and" and "or"), unless the context clearly indicates otherwise. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every.

Additional example embodiments are provided with reference to the following enumerated embodiments:

1. A method comprising: obtaining training data comprising one or more first datasets; determining (e.g., via a first model), based on the training data, whether a feature type satisfies a first condition; responsive to determining that the feature type satisfies the first condition, obtaining one or more second datasets to update the training data such that the updated training data comprises the one or more second datasets; determining (e.g., via the first model), based on the updated training data, whether the feature type satisfies a second condition; and responsive to determining that the feature type satisfies the second condition, providing the updated training data to a second model.

2. The method of embodiment 1, wherein the first condition is related to the feature type having a threshold amount of influence on the second model, the second condition is related to the feature type not having the threshold amount of influence on the second model.

3. The method of any of embodiments 1-2, wherein the first model comprises a relevancy model, and the second model comprises a prediction model.

4. The method of embodiment 3, wherein the prediction model comprises a machine learning model.

5. The method of embodiment 4, wherein the machine learning model comprises a neural network.

6. The method of any of embodiments 1-5, wherein the updated training data comprises the one or more second datasets and one or more of the one or more first datasets.

7. The method of embodiment 6, wherein the updated training data does not comprise one or more other ones of the one or more first datasets.

8. The method of any of embodiments 1-7, wherein: obtaining the training data comprising the one or more first datasets comprises randomly obtaining the one or more first datasets from a data corpus to generate the training data such that the training data comprises the randomly obtained first datasets; and obtaining the one or more second datasets comprises randomly obtaining additional datasets from the data corpus to update the training data such that the updated training data comprises the randomly obtained additional datasets and at least some of the randomly obtained first datasets.

9. The method of any of embodiments 1-8, wherein: determining, via the first model, based on the training data, whether the feature type satisfies the first condition comprises: providing the training data to the first model to determine a relevance of each feature type of a plurality of feature types with respect to an output of the second model if the second model is training on the training data; and determining, via the first model, based on the updated training data, whether the feature type satisfies the second condition comprises providing the updated training data to the first model to determine an updated relevance of each feature type of the plurality of feature types with respect to an output of the second model if the second model is trained on the updated training data.

10. The method of any of embodiments 1-9, wherein: the relevance comprises a relevancy score; the updated relevance comprises an updated relevancy score; the relevancy score and the updated relevancy score are computed by the first model, wherein the first model comprises a relevancy model; the threshold amount of influence comprises a relevancy threshold score; the relevance of the first feature type being determined to satisfy the first condition comprises determining that the relevancy score is equal to or greater than the relevancy threshold score; and the updated relevance of the first feature type being determined to satisfy the second condition comprises determining that the updated relevancy score is less than the relevancy threshold score.

11. The method of any of embodiments 1-10, further comprising: identifying a set of feature types that are to be prevented from having the threshold amount of influence on the second model, wherein the set of feature types comprises the feature type.

12. The method of embodiment 11, wherein the method further comprises: preventing each feature type of the set of feature types from having the threshold amount of influence on the second model.

13. The method of embodiment 12, wherein preventing comprises: determining, prior to providing the training data or the updated training data to the second model, that a relevance or an updated relevance of each feature type included within the set of feature types has an amount of influence on the second model that is less than the threshold amount of influence.

14. The method of any of embodiments 11-13, wherein the set of feature types further comprises at least one additional feature type, and the updated training data is provided to the second model responsive to determining, based on the updated training data provided to the first model, that the updated relevance of each of the first feature type and the at least one additional feature type satisfies the second condition.

15. The method of embodiment 14, wherein the one or more first datasets comprises a plurality of feature types, and the plurality of feature types comprises the at least one additional feature type.

16. The method of embodiment 14, wherein the one or more first datasets comprises a plurality of feature types, and wherein the plurality of feature types does not comprise the at least one additional feature type.

17. The method of embodiment 14, further comprising: determining, prior to providing the updated training data to the second model, that each feature type of the set of feature types satisfies the second condition.

18. The method of any of embodiments 1-17, wherein: obtaining the training data comprises randomly selecting the one or more first datasets from one or more data corpora; and wherein obtaining the one or more second datasets comprises randomly selecting the one or more second datasets from the one or more data corpora.

19. The method of embodiment 18, wherein: obtaining the training data comprises generating the training data using the randomly selected first datasets; and wherein obtaining the one or more randomly selected second datasets comprises generating the updated training data.

20. The method of any of embodiments 1-19, wherein the one or more first datasets comprise a first number of datasets and the one or more second datasets comprise a second number of datasets, and the first number of datasets is equal to, less than, or greater than the second number of datasets.

21. The method of any of embodiments 1-20, wherein the threshold amount of influence comprises a relevancy threshold score, determining whether the feature type satisfies the first condition comprises: determining whether a relevancy score for the feature type is equal to or greater than the relevancy threshold score.

22. The method of embodiment 21, wherein the relevancy score being equal to or greater than the relevancy threshold score indicates that the feature type would have the threshold amount of influence on the second model if the second model were trained on the training data.

23. The method of embodiment 22, wherein determining whether the feature type satisfies the second condition comprises: determining whether an updated relevancy score for the feature type is less than the relevancy threshold score.

24. The method of embodiment 23, wherein the updated relevancy score being less than the relevancy threshold score indicates that the feature type would not have the threshold amount of influence on the second model if the second model were trained on the updated training data.

25. The method of any of embodiments 1-24, wherein the one or more first datasets comprise a plurality of feature types, the additional datasets comprise the plurality of feature types, and the plurality of feature types comprise the feature type.

26. The method of embodiment 25, wherein the additional datasets further comprise one or more additional feature types.

27. The method of any of embodiments 1-26, further comprising: causing the second model to be trained based on the updated training data.

28. The method of any of embodiments 1-27, further comprising: receiving a request to generate training data to train the second model; and selecting the second model from a plurality of prediction models based on the request.

29. One or more tangible, non-transitory, machine-readable media storing instructions that, when executed by one or more processors, effectuation operations comprising those of any of embodiments 1-28.

30. A system comprising: one or more processors; and memory storing computer program instructions that, when executed by the one or more processors, cause the one or more processors to effectuate operations comprising those of any of embodiments 1-28.

What is claimed is:

1. A system for training a neural network, the system comprising:
a computer system that comprises one or more processors programmed with computer program instructions that, when executed, cause the computer system to:
obtain first datasets from a data corpus to generate first training data such that the first training data comprises the obtained first datasets, wherein the first datasets comprise a plurality of feature types, and wherein the plurality of feature types comprises a first feature type and a second feature type;
prior to the neural network being trained on the first training data, determine, via a principle component analysis (PCA) model, based on the first training data, a relevancy score of each feature type of the plurality of feature types with respect to an output of a neural network if the neural network is trained on the first training data;
determine that the relevancy score of the first feature type satisfies a first condition and that the relevancy score of the second feature type does not satisfy the first condition, wherein:
the first condition being satisfied comprises the relevancy score of the first feature type being equal to or greater than a threshold relevancy score indicating that the first feature type has equal to or greater than a threshold amount of influence on the neural network if the neural network is trained on the first training data;
responsive to determining that the relevancy score of the first feature type satisfies the first condition, obtain second datasets from the data corpus to update the first training data to obtain second training data, wherein the second training data comprises the second datasets and at least some of the first datasets, and wherein the second datasets comprise the plurality of feature types;
prior to the neural network being trained on the second training data, determine, via the PCA model, based on the second training data, an updated relevancy score of each feature type of the plurality of feature types with respect to an output of the neural network if the neural network is trained on the second training data;
determine that the updated relevancy score of the first feature type satisfies a second condition and that the updated relevancy score of the second feature type satisfies the second condition, wherein:
the second condition being satisfied comprises the updated relevancy score of the first feature type and the updated relevancy score of the second feature type being less than the threshold relevancy score indicating that the first feature type and the second feature type are determined to have less than a threshold amount of influence on the neural network if the neural network is trained on the second training data; and
responsive to determining that the updated relevancy score of the first feature type and the updated relevancy score of the second feature type both satisfy the second condition, use the second training data to train the neural network.

2. The system of claim 1, wherein the computer system is further caused to:
identify a set of feature types that are not to have the threshold amount of influence on the neural network, wherein:
the set of feature types comprises the first feature type and the second feature type of the plurality of feature types.

3. The system of claim 1, wherein the second datasets comprise the plurality of feature types and one or more additional feature types, the second training data is used to train the neural network responsive to determining that a relevancy score of each of the one or more additional feature types satisfy the second condition.

4. The system of claim 1, wherein the first datasets and the second datasets are obtained randomly.

5. The system of claim 1, wherein the second datasets further comprise a third feature type, wherein the one or more processors are further configured to:
determine that a third relevance of the third feature type satisfies the second condition, wherein the second training data is used to train the neural network responsive to determining that the updated relevancy score of the first feature type, the updated relevancy score of the second feature type, and third relevancy score satisfy the second condition.

6. The system of claim 1, wherein the second training data comprises the second datasets and one or more of the first datasets.

7. The system of claim 6, wherein the second training data does not comprise one or more other ones of the first datasets.

8. A method for training a neural network, the method being implemented by one or more processors configured to execute one or more computer program instructions, the method comprising:
obtaining first datasets from a data corpus to generate first training data such that the first training data comprises the obtained first datasets, wherein the first datasets comprise a plurality of feature types, and wherein the plurality of feature types comprises a first feature type and a second feature type;
prior to the neural network being trained on the first training data, determining, via a principle component analysis (PCA) model, based on the first training data, a relevancy score of each feature type of the plurality of feature types with respect to an output of a neural network if the neural network is trained on the first training data;
determining that the relevancy score of the first feature type satisfies a first condition and that the relevancy score of the second feature type does not satisfy the first condition, wherein:
the first condition being satisfied comprises the relevancy score of the first feature type being equal to or greater than a threshold relevancy score indicating that the first feature type has equal to or greater than a threshold amount of influence on the neural network if the neural network is trained on the first training data;
responsive to determining that the relevancy score of the first feature type satisfies the first condition, obtaining second datasets from the data corpus to update the first training data to obtain second training data, wherein the second training data comprises the second datasets and at least some of the first datasets, and wherein the second datasets comprise the plurality of feature types;

prior to the neural network being trained on the second training data, determining, via the PCA model, based on the second training data, an updated relevancy score of each feature type of the plurality of feature types with respect to an output of the neural network if the neural network is trained on the second training data;

determining that the updated relevancy score of the first feature type satisfies a second condition and that the updated relevancy score of the second feature type satisfies the second condition, wherein:

the second condition being satisfied comprises the updated relevancy score of the first feature type and the updated relevancy score of the second feature type being less than the threshold relevancy score indicating that the first feature type and the second feature type are determined to have less than a threshold amount of influence on the neural network if the neural network is trained on the second training data; and responsive to determining that the updated relevancy score of the first feature type and the updated relevancy score of the second feature type both satisfy the second condition, using the second training data to train the neural network.

9. The method of claim 8, wherein the first datasets and the second datasets are obtained randomly.

10. The method of claim 8, further comprising:
identifying a set of feature types that are not to have the threshold amount of influence on the neural network, wherein:
the set of feature types comprises the first feature type and the second feature type of the plurality of feature types.

11. The method of claim 8, wherein the second datasets comprise the plurality of feature types and one or more additional feature types, the second training data is used to train the neural network responsive to determining that a relevancy score of each of the one or more additional feature types satisfy the second condition.

12. The method of claim 8, wherein the second datasets further comprise a third feature type, the method further comprises:
determining that a third relevance of the third feature type satisfies the second condition, wherein the second training data is used to train the neural network responsive to determining that the updated relevancy score of the first feature type, the updated relevancy score of the second feature type, and third relevancy score satisfy the second condition.

13. The method of claim 8, wherein the second training data comprises the second datasets and one or more of the first datasets.

14. The method of claim 13, wherein the second training data does not comprise one or more other ones of the first datasets.

15. One or more non-transitory, computer-readable media storing instructions that, when executed by one or more processors, effectuate operations comprising:
obtaining first datasets from a data corpus to generate first training data such that the first training data comprises the obtained first datasets, wherein the first datasets comprise a plurality of feature types, and wherein the plurality of feature types comprises a first feature type and a second feature type;

prior to a neural network being trained on the first training data, determining, via a principle component analysis (PCA) model, based on the first training data, a relevancy score of each feature type of the plurality of feature types with respect to an output of a neural network if the neural network is trained on the first training data;

determining that the relevancy score of the first feature type satisfies a first condition and that the relevancy score of the second feature type does not satisfy the first condition, wherein:
the first condition being satisfied comprises the relevancy score of the first feature type being equal to or greater than a threshold relevancy score indicating that the first feature type has equal to or greater than a threshold amount of influence on the neural network if the neural network is trained on the first training data;

responsive to determining that the relevancy score of the first feature type satisfies the first condition, obtaining second datasets from the data corpus to update the first training data to obtain second training data, wherein the second training data comprises the second datasets and at least some of the first datasets, and wherein the second datasets comprise the plurality of feature types;

prior to the neural network being trained on the second training data, determining, via the PCA model, based on the second training data, an updated relevancy score of each feature type of the plurality of feature types with respect to an output of the neural network if the neural network is trained on the second training data;

determining that the updated relevancy score of the first feature type satisfies a second condition and that the updated relevancy score of the second feature type satisfies the second condition, wherein:
the second condition being satisfied comprises the updated relevancy score of the first feature type and the updated relevancy score of the second feature type being less than the threshold relevancy score indicating that the first feature type and the second feature type are determined to have less than a threshold amount of influence on the neural network if the neural network is trained on the second training data; and responsive to determining that the updated relevancy score of the first feature type and the updated relevancy score of the second feature type both satisfy the second condition, using the second training data to train the neural network.

16. The one or more media of claim 15, wherein the first datasets and the second datasets are obtained randomly.

17. The one or more media of claim 15, wherein the operations further comprise:
identifying a set of feature types that are not to have the threshold amount of influence on the neural network, wherein:
the set of feature types comprises the first feature type and the second feature type of the plurality of feature types.

18. The one or more media of claim 15, wherein the second datasets comprise the plurality of feature types and one or more additional feature types, the second training data is used to train the neural network responsive to determining that a relevancy score of each of the one or more additional feature types satisfy the second condition.

19. The one or more media of claim 15, wherein the second datasets further comprise a third feature type, the operations further comprise:
  determining that a third relevance of the third feature type satisfies the second condition, wherein the second training data is used to train the neural network responsive to determining that the updated relevancy score of the first feature type, the updated relevancy score of the second feature type, and third relevancy score satisfy the second condition.

20. The one or more media of claim 15, wherein:
  the second training data comprises the second datasets and one or more of the first datasets; and
  the second training data does not comprise one or more other ones of the first datasets.

* * * * *